United States Patent
Benosman et al.

(10) Patent No.: US 10,044,193 B2
(45) Date of Patent: Aug. 7, 2018

(54) SYSTEM AND METHOD FOR CONTROLLING OUTPUTS OF PHOTOVOLTAIC SYSTEM

(71) Applicant: Mitsubishi Electric Research Laboratories, Inc., Cambridge, MA (US)

(72) Inventors: Mouhacine Benosman, Boston, MA (US); Chun Wei, Lincoln, NE (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 203 days.

(21) Appl. No.: 15/218,406

(22) Filed: Jul. 25, 2016

(65) Prior Publication Data
US 2018/0026449 A1    Jan. 25, 2018

(51) Int. Cl.
| H02J 3/00 | (2006.01) |
| H02J 3/38 | (2006.01) |
| H02S 40/32 | (2014.01) |
| H02J 3/16 | (2006.01) |

(52) U.S. Cl.
CPC ............ *H02J 3/385* (2013.01); *H02J 3/16* (2013.01); *H02S 40/32* (2014.12)

(58) Field of Classification Search
CPC ...................................................... H02J 3/385
See application file for complete search history.

(56) References Cited

U.S. PATENT DOCUMENTS

| 5,867,375 A | * | 2/1999 | Svensson | ............... | H02J 3/36 363/35 |
| 8,106,537 B2 | | 1/2012 | Casey et al. | | |

* cited by examiner

*Primary Examiner* — Hai L Nguyen
(74) *Attorney, Agent, or Firm* — Gene Vinokur; James McAleenan; Hironori Tsukamoto

(57) ABSTRACT

A voltage at a point of common coupling (PCC) between a photovoltaic (PV) system and a power grid is regulated by a controller having a gain determined according to a gain function that is a function of a time. The gain function is determined based on an error between the voltage measured at the PCC and the reference voltage, and the gain is updated according to the updated gain function and a current instance of time. The controller generates a modulating signal using the updated gain and the voltage at the PCC is regulated according to the modulating signal.

20 Claims, 9 Drawing Sheets

SYSTEM AND METHOD FOR CONTROLLING OUTPUTS OF PHOTOVOLTAIC SYSTEM

TECHNICAL FIELD

This invention relates generally to controlling outputs of photovoltaic systems, and more particularly to regulating a voltage at a point of common coupling (PCC) of a photovoltaic (PV) system and a power grid.

BACKGROUND

As photovoltaic (PV) solar power systems continue to increase in number and in scale, harvesting and managing power efficiently has become more challenging. Equally as challenging is the management of PV power installations on a national level via a "smart grid". In particular, it is desirable to increase the demand for renewable energy, to supplement and/or replace energy produced via fossil fuels. Enhancing PV power use, however, requires reduction in the production cost per kilowatt hour and reduction in utility transaction costs for PV interconnections.

Some PV power generating and control systems use at least one of centralized inverters, bipolar centralized inverters, string inverters, and micro-inverters. Conventionally, DC/AC inverters have been used to extract maximum power from PV systems that include arrays formed by plural PV modules connected in series and parallel configurations and to convert the unregulated generated DC power to grid-voltage, synchronized AC power. The AC power generated can be transmitted and distributed either directly to AC loads or through distribution transformers. According to this method, low-voltage DC power transfer concerns and simplicity of power conversion options necessitate configuring the PV modules in serial strings and/or in parallel string arrays. However, the deleterious effects of shading, soiling, and other lighting degradation on individual PV modules and, hence, PV module characteristics matching require greater consideration.

For example, recently, the voltage at a point of common coupling (PCC) of a photovoltaic (PV) system and a power grid is regulated by controlling the amount of reactive power injected to the grid by PV. For example, proportional-integral (PI) controller has been extensively used for this regulation. However, the PI controllers with fixed gain fail to operate well in case of rapid load variations. To that end, some method proposed using PI controllers with as fuzzy logic and artificial neural networks to update the control gains according to an error between current and reference voltages. Unfortunately, modifying gains of the controllers can complicate the operation of the power grid. For example, abrupt gain change can jeopardize voltage stability and accuracy of the control, and increases the complexity of the control system. To that end, some method proposed determining gains of the controller during the offline simulations, which is a time consuming task.

Accordingly, there is a need to provide a system and a method for controlling outputs of the PV system.

SUMMARY

It is an object of some embodiments of an invention to provide a system and a method for controlling outputs of the photovoltaic (PV) system. It is another object of some embodiments to provide a system and a method for regulating a voltage at a point of common coupling (PCC) between the PV system and a power grid.

Some embodiments are based on recognition that power grid is a complex, rapidly changing, and dynamically interconnected system. The parameters, e.g., gains, of the controller regulating the voltage on the PCC between the PV system and the power grid influence on the dynamic response of the grid in both transient and steady states. Even if during the steady state, the predetermined gains are arguably accurate, those gains are unsatisfactory for the transient state. Moreover, it is difficult and at least impractical to design gains offline for the transient state of the grid. To that end, some embodiments determine the gain of the controller online, i.e., during the operation of the PV system.

Some embodiments are based on realization that to reduce the error between current and reference voltages during transient and steady states of the power grid, the gains of the controller should be updated not only based on an error between the current voltage at the PCC and the reference voltage, but also as a function of time. For example, the gains can be the function of time that is determined as a function of the error. Such a controller can better adapt to load changes and grid faults, thus improving the power system reliability and voltage stability. However, it is impractical to determine the functions and the gains of such a controller offline. To that end, some embodiments determine a gain function during the operation of the power grid. The gain function is determined as a function of time, in response to change of the error between the current voltage and the reference voltage, and the gain of the controller is determined according to the gain function and the current instant of time.

For example, one embodiment uses an adaptive voltage control method of distribution systems with high PV penetration based on the model-free learning method. The gains of the voltage controller are updated online to respond dynamically to system changes through the minimization of a cost function, which represents performance of the voltage controller. For example, one embodiment uses a time-varying extremum seeking (TES) method, which allows to search for the extremum of a time-varying cost function associated with a given process performance without the need for a precise model of the process.

Accordingly, one embodiment discloses a voltage source converter (VSC) for regulating a voltage at a point of common coupling (PCC) between a photovoltaic (PV) system and a power grid. The controller includes a circuitry to accept a reference voltage for the PCC and measurements of a voltage at the PCC; a controller including a processor to generate a modulating signal using at least one gain; an extremum seeking controller to determine the gain, wherein the extremum seeking controller determines a gain function based on an error between the voltage at the PCC and the reference voltage, wherein the gain function is a function of time; and updates a gain of the controller according to the gain function and a current instance of time; and an inverter to regulate the voltage at the PCC according to the modulating signal.

Another embodiment discloses a method for regulating a voltage at a point of common coupling (PCC) between a photovoltaic (PV) system and a power grid. The method includes receiving a reference voltage for the PCC and measurements of a voltage at the PCC; determining a gain function based on an error between the voltage measured at the PCC and the reference voltage, wherein the gain function is a function of a time; updating a gain according to the updated gain function and a current instance of time; generating a modulating signal using the updated gain; and regulating the voltage at the PCC according to the modulating signal. At least some steps of the method are performed using a processor.

Yet another embodiment discloses a non-transitory computer readable storage medium embodied thereon a program executable by a processor for performing a method for regulating a voltage at a point of common coupling (PCC) between a photovoltaic (PV) system and a power grid. The method includes determining a gain function based on an error between a voltage measured at the PCC and a reference voltage for the PCC, wherein the gain function is a function of a time; updating a gain according to the updated gain function and a current instance of time; generating a modulating signal using the updated gain; and regulating the voltage at the PCC according to the modulating signal.

DETAILED DESCRIPTION

Figure 1A:
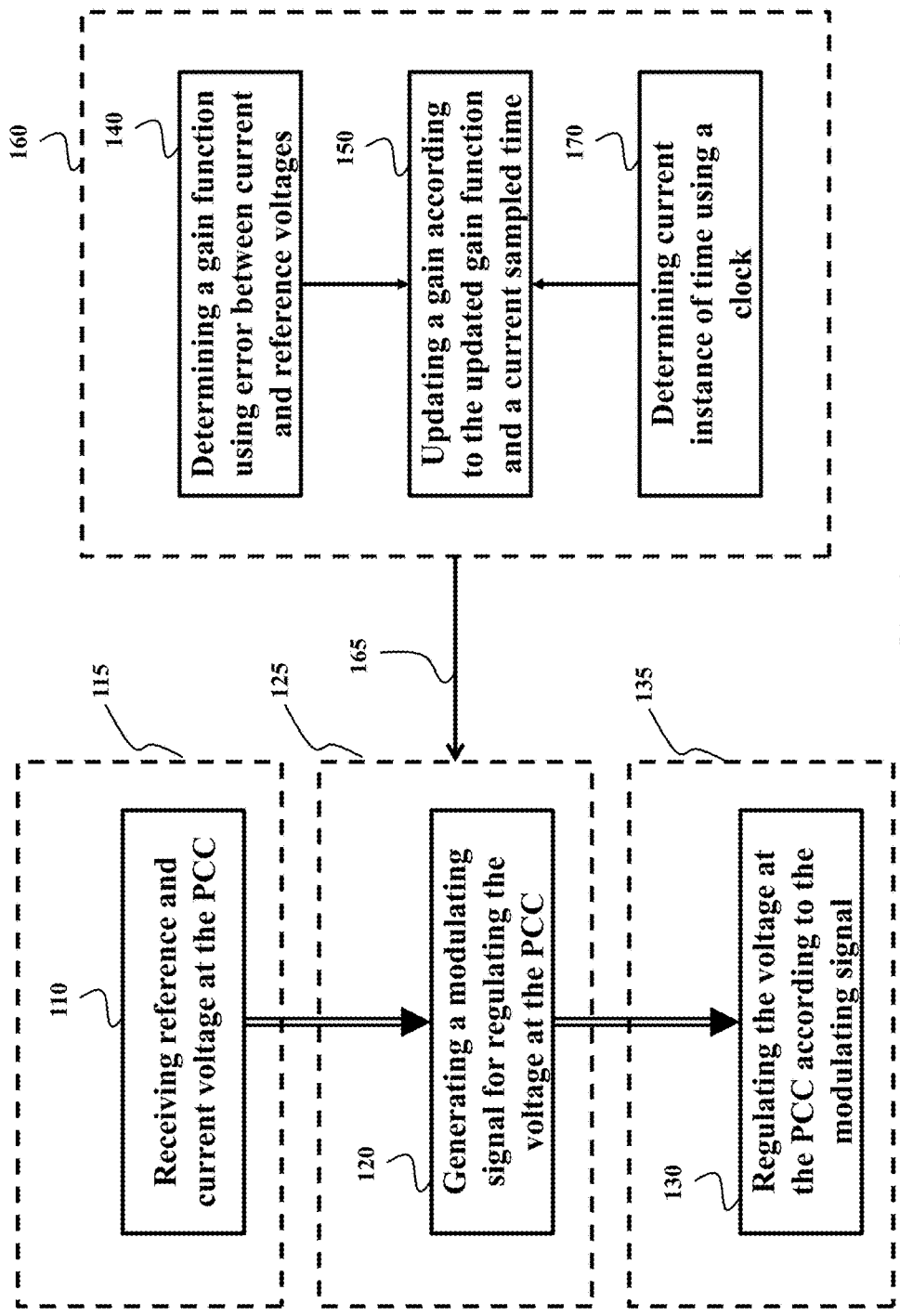
FIG. 1A is a block diagram of a method for regulating a voltage at a point of common coupling (PCC) between a photovoltaic (PV) system and a power grid according to one embodiment of the invention.

FIG. 1A shows a block diagram of a method for regulating a voltage at a point of common coupling (PCC) between a photovoltaic (PV) system and a power grid according to one embodiment of the invention. The method can be implemented using voltage source converter (VSC) including at least one processor for performing at least some steps of the method.

The method receives 110 a reference voltage for the PCC and measurements of a voltage at the PCC. To that end, the VSC can include a circuitry 115 to accept the reference voltage for the PCC and measurements of the voltage at the PCC. For example, the circuitry 115 can include a memory and an input output ports to exchange information with other components of the VSC and/or external devices. For example, the reference voltage for the PCC can be predetermined and stored in the memory. The measurements of the voltage can be determined by a sensor, such a voltmeter, configured to measure the voltage. Additionally or alternatively, the voltage can be measure directly or indirectly by different sensors, e.g., by sensors that determine voltage based on measurements of the current. The reference voltage and the measurements of the voltage can be received by the circuitry of the VSC through a communication channel of any type.

The method determines 120 a modulating signal generated to regulate the voltage at PCC. For example, the modulating signal is determined by a controller 125 of the VSC based on a gain 165. For example, the controller can include a proportional-integral (PI) controller with varying gains. The method updates gains 165 and the modulating signal and regulates 130 the voltage at the PCC according to the updated modulating signal. For example, the voltage can be regulated 130 using an inverter 135. The controller can be implemented using a processor of the VSC and/or an additional processor.

As used herein, the term processor will be understood to encompass can be a single core microprocessor, a multi-core microprocessor, a computing cluster, a field programmable gate array (FPGA), application specific integrated circuit (ASIC), or any number of other configurations including combinations thereof. The memory can include random access memory (RAM), read only memory (ROM), flash memory, or any other suitable memory (including storage) systems. As used herein, the term "non-transitory computer-readable storage medium" will be understood to encompass volatile memory (e.g., DRAM and SRAM) and non-volatile memory (e.g., flash, magnetic, and optical memories) but to exclude transitory signals.

Some embodiments of the invention are based on recognition that power grid is a complex, rapidly changing, and dynamically interconnected system. The parameters, e.g., gains, of the controller regulating the voltage on the PCC of the PV system and the power grid influence on the dynamic response of the grid in both transient and steady states. Even if during the steady state, the predetermined gains are arguably accurate, those gains are unsatisfactory for the transient state. Moreover, it is difficult and at least impractical to design gains offline for the transient state of the grid. To that end, some embodiments determine the gain of the controller during the operation of the PV system.

Some embodiments are based on realization that to reduce the error between current and reference voltages during transient and steady states of the power grid, the gains of the controller should be updated not only based on based on function of the error between the current voltage at the PCC and the reference voltage, but also as a function of time. For example, the gains are the function of time that is determined as a function of the error. Such a controller can adapt better to load changes and grid faults, thus improving the power system reliability and voltage stability. However, it is impractical to determine the functions and the gains of such a controller offline. To that end, some embodiments determine a gain function, as a function of time, based on the error between the current voltage and the reference voltage, and update the gain of the controller according to the updated gain function and the current instant of time.

To that end, the method of FIG. 1A updates 140 a gain function, e.g., in response to a change of an error between the voltage at the PCC and the reference voltage. The gain function is a function of a time and the method updates 150 a gain 165 of the controller according to the updated gain function and a current instance of time determined by a clock 170. For example, one embodiment updates the gain 165 using an extremum seeking controller 160. For example, the extremum seeking controller 160 can determine the gain function using a time-varying extremum seeking performing a time-varying perturbation of the gain function.

Figure 1B:
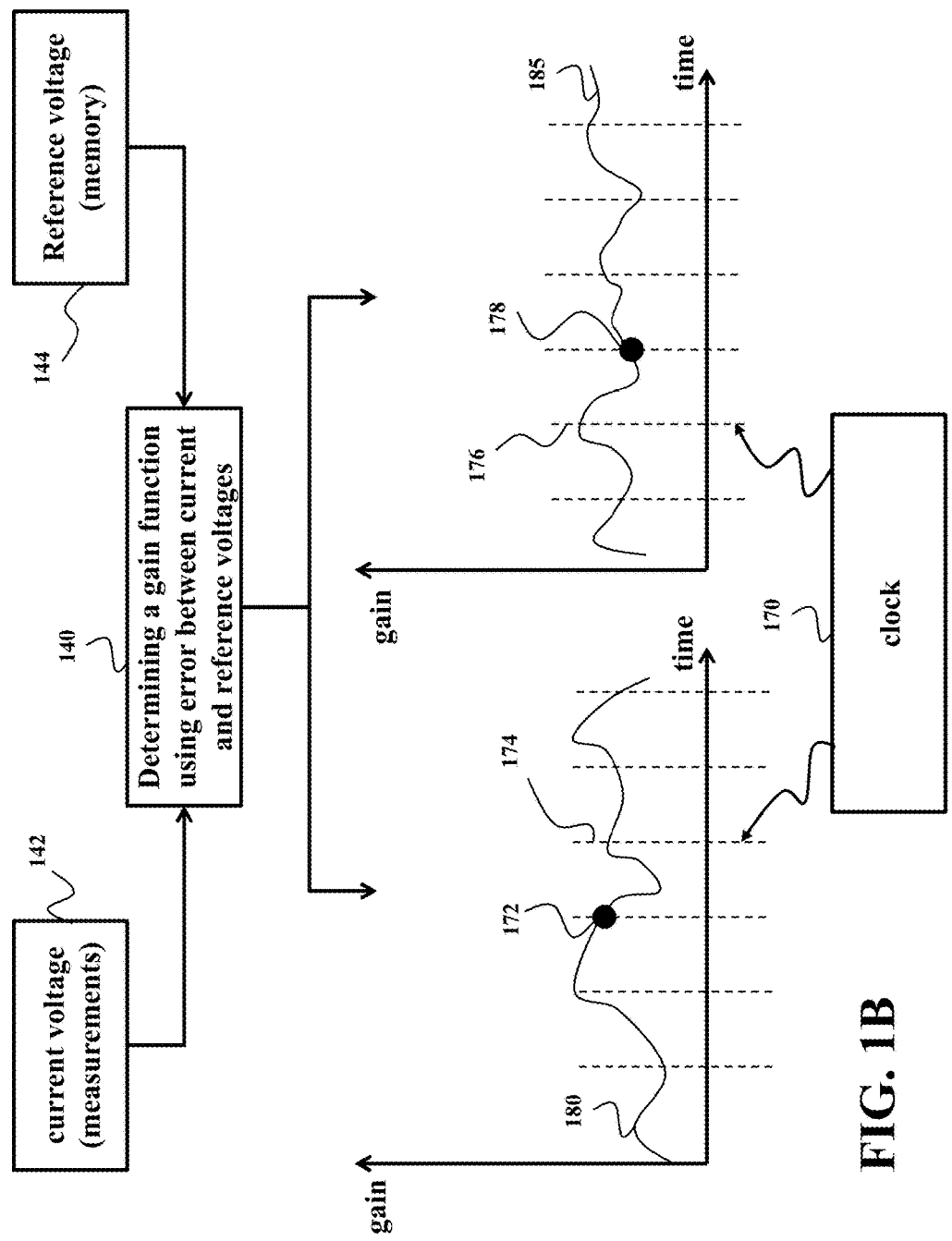
FIG. 1B is a schematic illustrating a selection of a gain of the controller for determining the modulating signal to control the voltage at the PCC according to one embodiment.

FIG. 1B shows a schematic illustrating a selection of a gain of the controller for generating the modulating signal. Instead of selecting the gain directly for an error between the current 142 and the reference 144 voltages, the method uses that error to select 140 a gain function 180 or 185. The gain is selected based on the gain function and the time instances 172, 174, 176, and 178 produced by a clock 170. For example, even if the time instances 172 or 178 are identical, or similar, the gains can vary for different gain functions, which add flexibility to the gain determination. Such flexibility allows producing different values of the gain for transient and steady state of the power grid.

Figure 2:
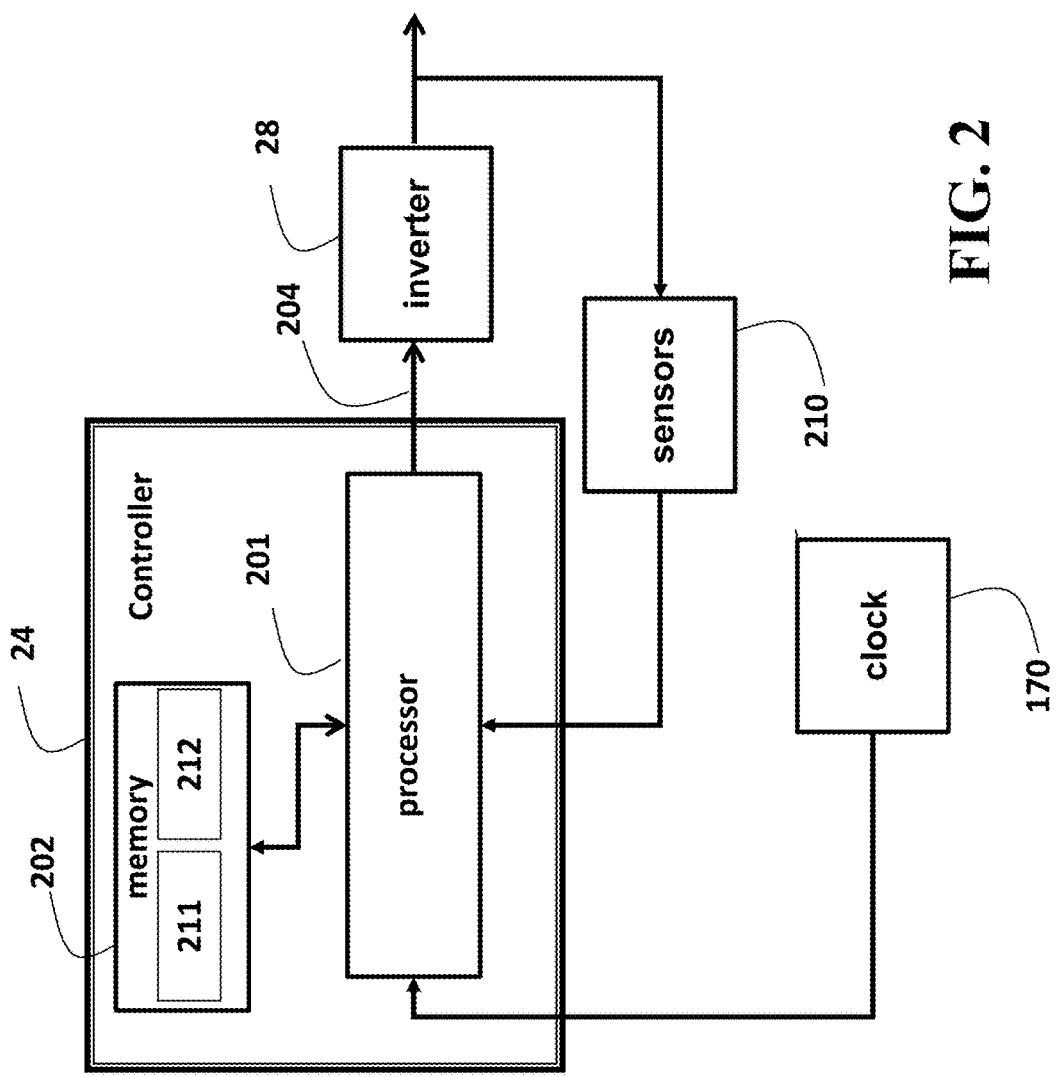
FIG. 2 is a block diagram of the controller according to one embodiment of the invention.

FIG. 2 shows a block diagram of the controller 24 according to one embodiment of the invention. The controller 24 includes a processor 201 connected to a memory 202, e.g., a non-transitory computer readable medium. In some implementations, the memory 202 includes a first section 211 for storing information about the power grid and a second section 212 for storing a program for controlling the controller. For example, the first section 211 of the memory 202 can store the reference voltage 144 and/or other parameters for selecting the gain function. The second section 212 of the memory 202 can have embodied thereon a program executable by the processor 201 for performing a method for regulating a voltage at the PCC of the PV system and the power grid.

The processor 201 can be any computational device capable of performing computations, and can include one or many physical devices of the same or of different types. Additionally or alternatively, the processor 201 can include multiple computational devices, e.g., microprocessors. Similarly the memory 202 can be any logical memory and/or non-transitory computer readable storage medium capable of storing information, and can include one or more physical information storage means, of the same or of different types. The computations performed by the processor 201 are commanded by the program stored in the second section of the memory 212, and use the information stored in the first section of the memory 211, the information about the state of the power grid obtained from the sensors 210, and the current time instance obtained from the clock 170. The computation of the processor 201 result in modulating signal 204 that change the operation of the inverter 28 to regulate the voltage on the PCC.

Figure 3:
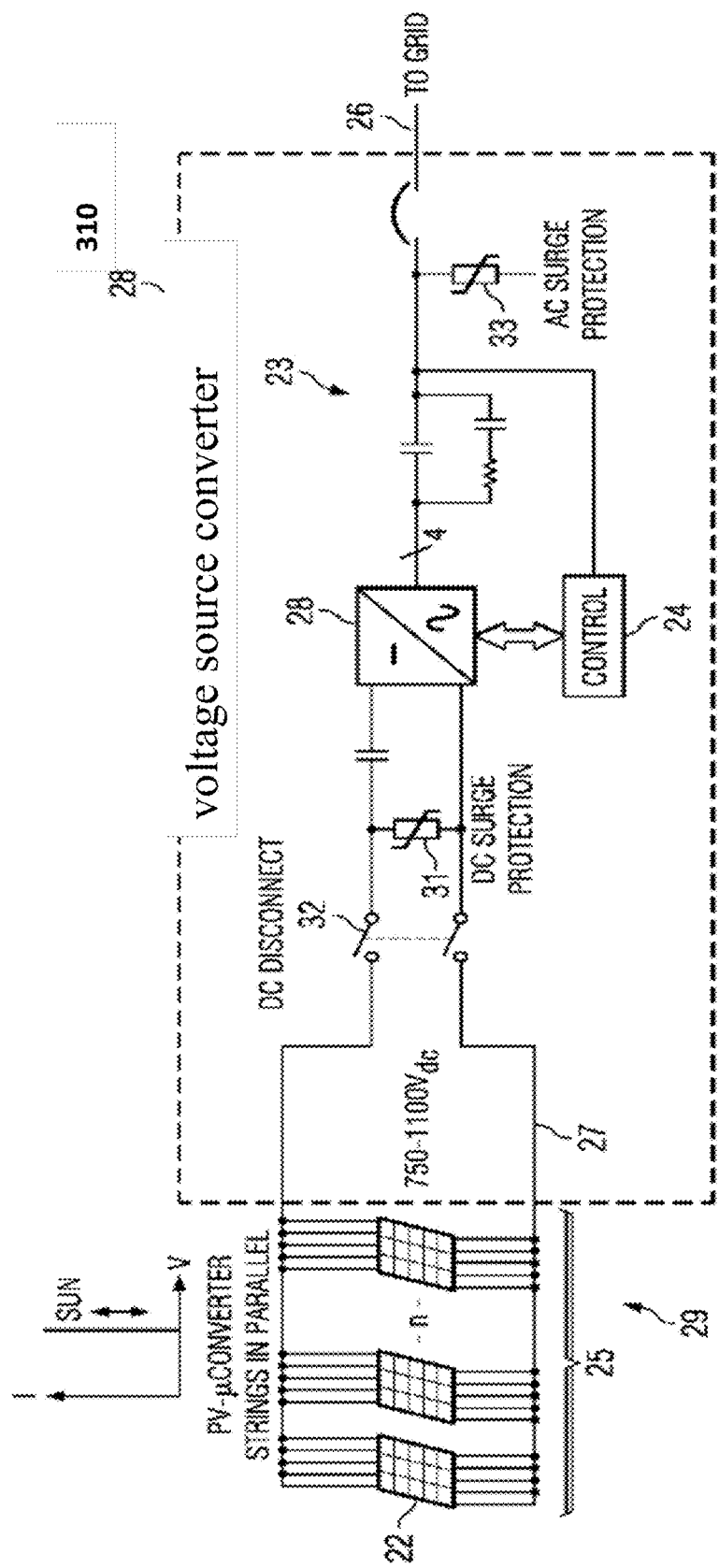
FIG. 3 is a schematic of a voltage source converter according to one embodiment of the invention.

FIG. 3 shows a schematic of a voltage source converter 310 that includes the controller 24 of FIG. 2 according to one embodiment of the invention. For example, the PV system can be controlled at the string-level by plural DC/DC micro-converters. The PV system 29 can be structured and arranged to extract maximum individual string power (hereinafter, the "Maximum Power Point" or "MPP") from each of the PV modules 22 in each string 25 of serial-connected PV modules that make up the power-generating portion of the PV system 29.

The PV system 29 can include includes a power-generating portion, a power control, and distribution portion, and the aforementioned control system. The PV system 29 is connected to the VSC 310, e.g., through a high voltage DC (HVDC) buss 27. Because the HVDC buss 27 carries higher voltage, the associated currents are relatively low, which reduces conduction losses. In turn, the HVDC buss 27 is electrically coupled to the VSC 310, the output of which is delivered to a commercial grid, to a utility grid 26 and/or to a local AC load. The VSC 310 includes the control unit 24 coupled to an inverter 28. For example, the inverter adjusts a magnitude of a reactive current reference according to the modulating signal to regulate the voltage at the PCC.

The VSC 310 can optionally include an energy storage device 23 integrated using, e.g., bi-directional converters operating from the HVDC buss 27. "The energy storage device 23 can be a battery or other DC energy storage device in combination with a separate DC/AC inverter. In one embodiment, at the input stage of the VSC 310, a switching system 32 controls application of power generated by the PV array to the inverter 28. A DC power surge protector 31 is coupled to the HVDC buss 27 at or proximate to the switching system 32. At the output stage, to guard against AC back feed from the commercial/utility grid 26, an AC surge protector 33 is provided. The AC surge protector 33 can include rectifier diodes that serve as blocking diodes.

Figure 4:
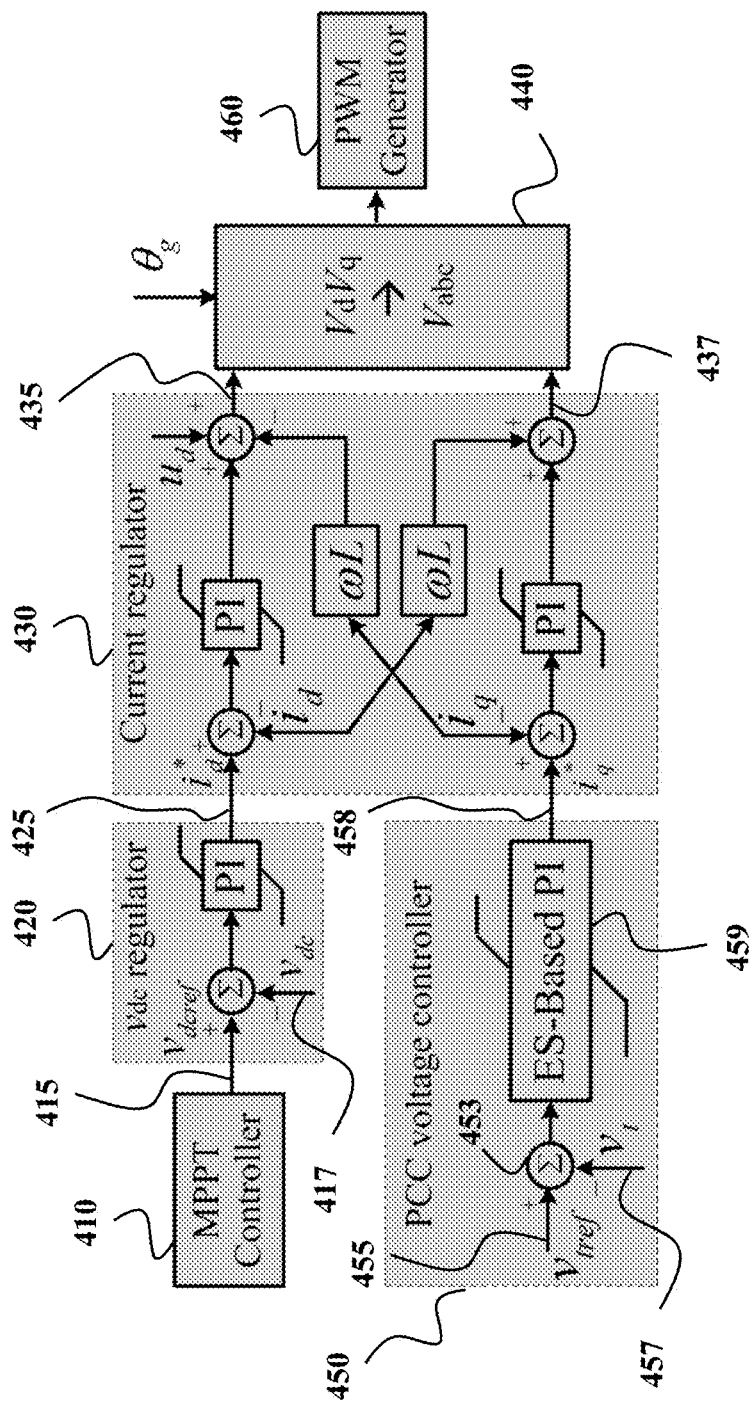
FIG. 4 is a block diagram of a three-phase grid-connected voltage source converter (VSC) according to one embodiment.

FIG. 4 shows a block diagram of a three-phase grid-connected VSC according to one embodiment that uses a concept of instantaneous power on the synchronous rotating dq reference frame. The controller of such a grid-connected VSC includes a maximum power point tracking (MPPT) controller 410 to estimate a voltage corresponding to a global maximum power point (MPP) of power generated by the PV system. The controller includes a voltage regulator 420 to produce an active current reference in accordance with voltage corresponding to the global MPP voltage. The controller includes a PCC voltage controller 450 to produce a reactive current reference based on the gain of the controller and the error between the voltage at the PCC and the reference voltage. The controller includes a current regulator 430 to determines reference voltages for the inverter based on the active current reference and the reactive current reference, and a pulse-width modulation (PWM) generator 460 for generating the modulating signal as a PWM signal to control the inverter.

For example, the MPPT controller 410 and PCC voltage controller 450 are responsible for determining the active and reactive power exchange between the PV system and the utility grid. The main purpose of a grid-connected PV system is to transfer the maximum solar energy into the utility grid. To achieve this, a MPPT controller is used to maximize the instant power generated by the PV array. In one embodiment, the MPPT controller uses perturbation and observation (P&O), also known as hill climb search method, for maximum power point tracking control due to relatively simple structure of such a control. The MPPT controller varies the $v_{dc}$ reference signal 415 of the voltage regulator 420 in order to obtain a dc voltage 417 that extracts maximum power from the PV system. The generated $v_{dc}$ reference is set to the voltage regulator 420 to determine the required $i_d$ (active component) reference for the current regulator 430. Example of the MPPT controller is provided in U.S. 2015/069,840.

The VSC controls the supply of the reactive power from the PV system to the power grid to regulate the voltage profile in the PCC of the PV system. The PCC voltage of the PV system is controlled by the voltage controller 450 through the modulation of the reactive component 458 of the output current $i_q$. To this aim, the magnitude of the voltage 455 measured at the PCC is compared 453 to a voltage reference 457. An error signal is produced and then fed to controller 24. In the example of FIG. 4, the controller 24 is a PI controller 459 with varying gained updated using a time-varying extremum seeking (ES) performing a time-varying perturbation of the gain function.

Based on the current references $i_d$ and $i_q$, the current regulator 430 determines the required reference voltages 435 and 437 for the inverter. In one embodiment, a vector control approach is used, with a reference frame oriented along the grid voltage vector position $\theta_g$ that is measured by a phase lock loop (PLL), enabling independent control of the active and reactive power. The voltage reference in the dq form is transformed 440 to abc components through the phase angle $\theta_q$ to obtain the positive sequence components of the ac voltage at the PCC. After the reference voltages for the inverter are obtained, the modulating signal to control the inverter based on the required reference voltages are generated by the PWM generator 460.

Control of PCC Voltage

In one embodiment, the controller 459 of the PCC voltage controller 450 receives measurements of the voltage at the PCC at determines its root mean square (RMS) value 457, $v_t$. The RMS value is then compared 453 to a reference voltage 455, $v_{tref}$. The reference voltage 455 can be a utility specified voltage schedule and can be adjusted, if necessary. The error between the actual and reference voltage is fed back to adjust the reference output current component 458 $i_q^*$, which is the magnitude of the reactive current reference used to regulate $v_t$ to the reference $v_{tref}$. The PCC voltage control can be expressed as $$i_q^* = K_P[v_{tref}(t) - v_t(t)] + K_I \int_0^t [v_{tref}(t) - v_t(t)] dt \qquad (1)$$

where $K_P$ and $K_I$ are the proportional and integral gain parameters of the PI controller. The two gain parameters of the PI controller affect the voltage regulation dynamics. Therefore, various embodiments of the invention determine gains to optimize the PI controller performance for an effective and efficient voltage regulation. For example, some embodiments use model-free ES methods to auto-tune the PI gains online.

Extremum Seeking for Steady State Optimization

Figure 5:
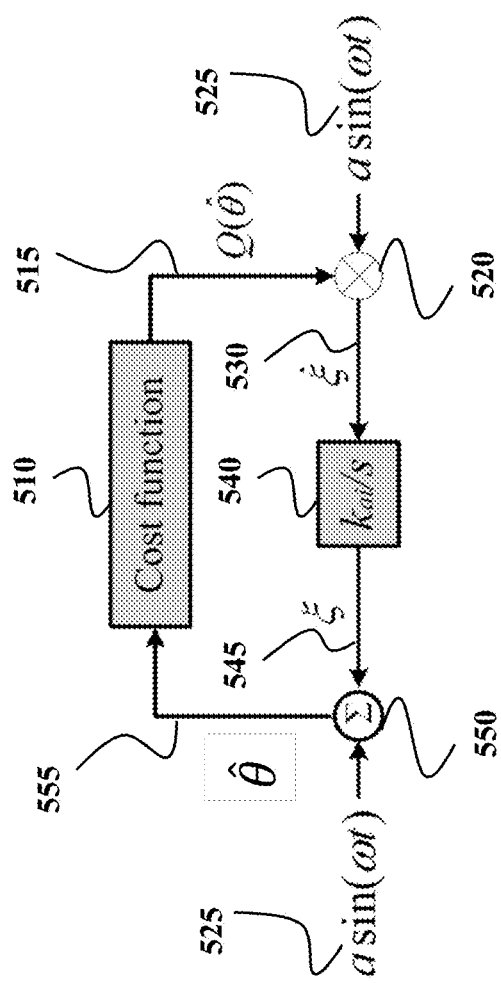
FIG. 5 is a schematic of extremum seeking optimization that the controller can use during a steady state of the power grid.

FIG. 5 shows a schematic of extremum seeking (ES) optimization that the controller 24 can use during a steady state of the power grid according to one embodiment. The steady state ES optimization injects 520 a sinusoidal perturbation a sin $\omega$t 525 into the system, resulting in an output 515 of the cost function $Q(\hat{\theta})$ 510, which function of the optimization variable $\theta$, such as voltage on the PCC. This output 515 is subsequently multiplied by a sin $\omega$t 525. In such a manner, the effects of the injection 525 can be detected. The resulting signal 530, $\dot{\xi}$, is an estimate of the gradient of the cost function with respect to the optimization variable $\theta$. The gradient estimate 530 is then passed through an integrator 540 $k_{ai}/s$ and the integrated gradient 545 is added 550 to the modulation signal a sin $\omega$t 525. The corresponding equations for the steady state ES optimization:

$$\dot{\xi}_i = a_i k_{ai} \sin(\omega_i t) Q(\hat{\theta}), \qquad (2)$$

$$\hat{\theta}_i = \xi_i + a_i \sin(\omega_i t), \qquad (3)$$

where $\omega_i \neq \omega_j$, $\omega_i + \omega_j \neq \omega_k$, i, j, $k_{ai}$, $\in \{1, 2, n\}$, and $\omega_i > \omega^*$, with $\omega^*$ is selected large enough to ensure the convergence. If the parameters $a_i$, $\omega_i$, and $k_{ai}$ are properly selected, the cost function output $Q(\theta^*)$ converges to an neighborhood of the optimal cost function value $Q(\theta^*)$. Alternative embodiments can use different implementation of ES.

Extremum Seeking for Steady and Transient State Optimization

Figure 6A:
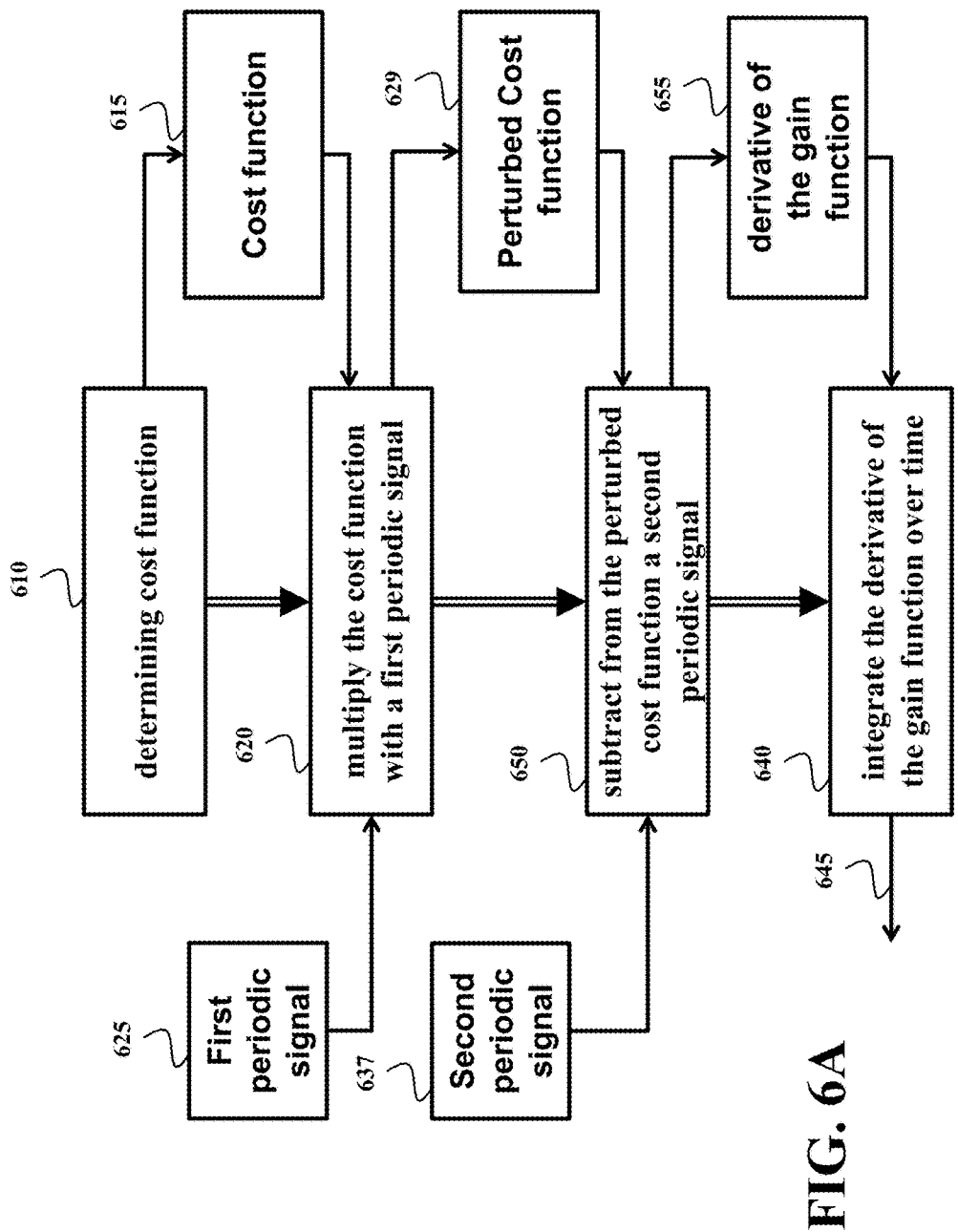
FIGS. 6A and 6B are a block diagram and a schematic of an extremum seeking optimization according to one embodiment that the controller can use during a steady and a transient state of the power grid.

FIG. 6A shows a block diagram of a method for updating gains using a time-varying extremum seeking according to one embodiment of the invention that the controller 24 can use during a steady and a transient state of the power grid. In this embodiment, the extremum seeking controller determines 610 a cost function 615 relating the gain function 645 to a difference between the voltage at the PCC and the reference voltage integrated over time, such that the gain function is the function of time. The extremum seeking controller multiplies 620 the cost function 615 with a first periodic signal 625 of time to produce a perturbed cost function 629 and subtracts 650 from the perturbed cost function 629 a second periodic signal 637 having a ninety degrees' quadrature phase shift with respect to a phase of the first periodic signal 625 to produce a derivative 655 of the gain function. The extremum seeking controller integrates the derivative of the gain function over time to produce the gain function 645 as the function of time.

Figure 6B:
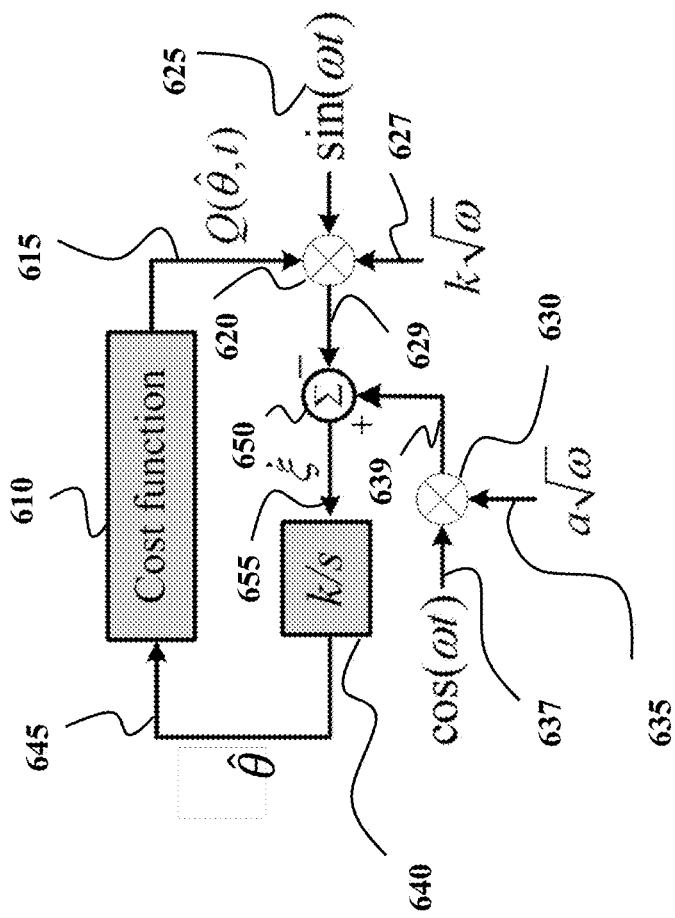

FIG. 6B shows a schematic of ES optimization of FIG. 6A. In this case the ES optimization injects a modulation signal sin $\omega$t 625 multiplied by a gain $k\sqrt{(\omega)}$ 627. The solution of the product 620 is then subtracted 610 from a modulation signal in quadrature phase with the first modulation signal cos $\omega$t 637, multiplied with a gain $a\sqrt{(\omega)}$ 635. Finally, the result of the subtraction 610 is integrated 640 and the solution of the integration 645 is evaluated by the cost function 610. This process is then repeated in closed-loop, until convergence of the solution $\theta$ to the optimal value $\theta^*$.

The corresponding equation for the multi-parameter ES for steady and transient state optimization can include $$\dot{\hat{\theta}}_i(t) = a\sqrt{\omega_i} \cos(\omega_i t) - k\sqrt{\omega_i} \sin(\omega_i t) Q(\hat{\theta}, t), \qquad (4)$$

where a and k are positive numbers, $\omega_i \neq \omega_j$, j, $\in \{1, 2, n\}$, and $\omega_i > \omega^*$, with $\omega^*$ selected large enough to ensure the convergence.

Figure 7:
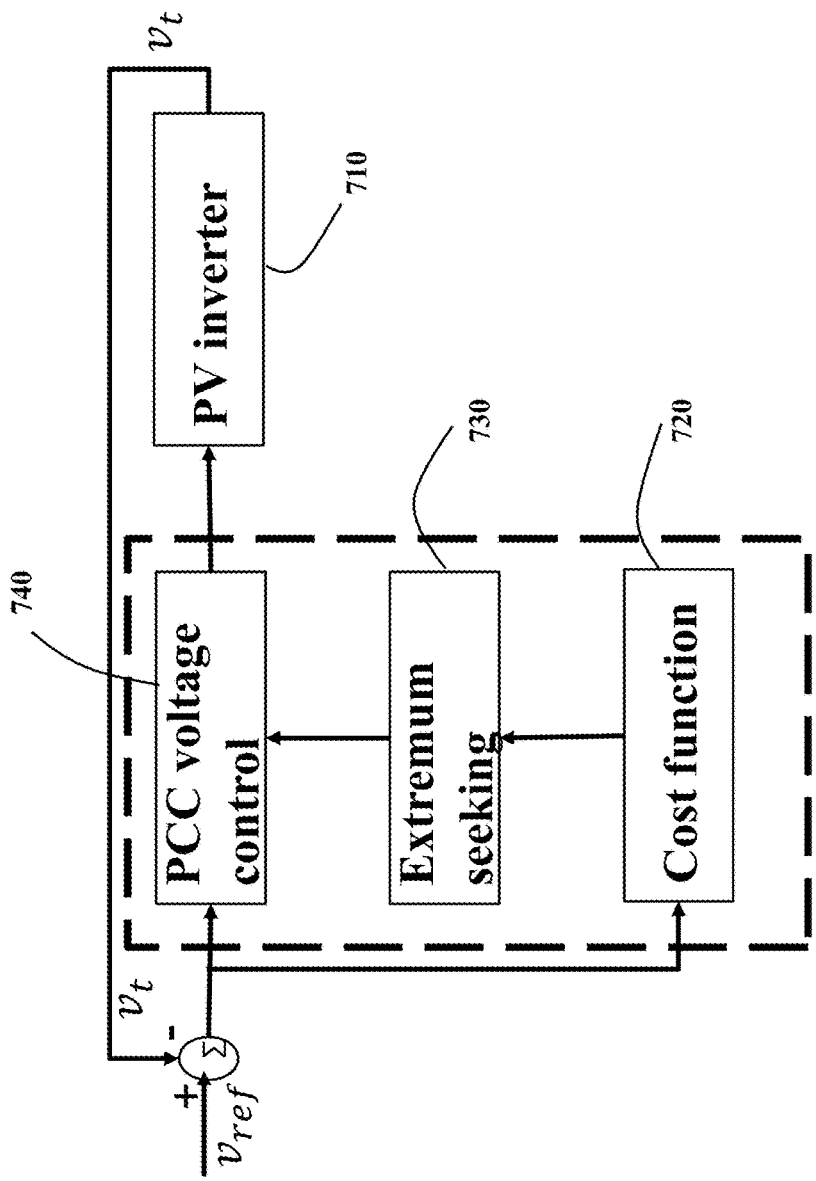
FIG. 7 is a block diagram of a method for regulating a voltage at the PCC according to one embodiment that uses extremum seeking.

FIG. 7 shows a block diagram of a method for regulating a voltage at the PCC according to one embodiment that uses ES 730 for updating the gains of the controller 740 to control the PV system's inverter 710. The embodiment uses ES to update gains of the PCC voltage controller 740 such that the tracking error of the closed loop system with an unknown plant is minimized. The effectiveness of the controller is quantified using a cost function 720.

One embodiment uses the following cost function evaluated at the conclusion of a voltage variation (such as that caused by the load changes)

$$Q(\theta, t) = \int_{t_0}^{T} [v_{tref}(t) - v_t(t)]^2 dt, \qquad (5)$$

where $t_0$ and T are the start and end times during the voltage variation at which the embodiment takes into account the error during calculation of the cost function, $\theta$ is a vector that includes gains of the controller, $\theta = [K_P, K_I]^T$.

For example, the variations of the estimated gains are $$\dot{\xi}_{K_P} = a_{K_P} \sin(\omega_1 t) Q(\hat{\theta}_{K_P}, t),$$

$$\hat{K}_P(t) = \xi_{K_P}(t) + a_{K_P} \sin(\omega_1 t),$$

$$\dot{\xi}_{K_I} = a_{K_I} \sin(\omega_2 t) Q(\hat{\theta}_{K_P}, t),$$

$$\hat{K}_I(t) = \xi_{K_I}(t) + a_{K_I} \sin(\omega_2 t). \qquad (6)$$

The ES 730 uses the discrete value of the cost function 720 generated at the completion of each iteration to compute the next set of controller parameters, $\theta$. When a new voltage variation, the controller updates the gains and the process continues iteratively until termination condition is met, e.g., the optimal gains are found.

In another embodiment, the following cost function is evaluated at each instance of time $\Delta t$:

$$Q(\theta, \Delta t) = [v_{tref}(t) - v_t(t)]^2 \qquad (7)$$

In this embodiment, the variations of the estimated gains are $$\dot{\hat{K}}_P(t)=a_1\sqrt{\omega_1}\cos(\omega_1 t)-k_1\sqrt{\omega_1}\sin(\omega_1 t)Q(\hat{\theta}_{K_P},\Delta t),$$

$$\dot{\hat{K}}_I(t)=a_2\sqrt{\omega_2}\cos(\omega_2 t)-k_2\sqrt{\omega_2}\sin(\omega_2 t)Q(\hat{\theta}_{K_I},\Delta t), \qquad (8)$$

The ES uses the discrete value of the cost function generated at each current instance of time to compute the set of controller parameters θ for the next instance of time.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A voltage source converter (VSC) for regulating a voltage at a point of common coupling (PCC) between a photovoltaic (PV) system and a power grid, comprising:
   a circuitry to accept a reference voltage for the PCC and measurements of a voltage at the PCC;
   a controller including a processor to generate a modulating signal using at least one gain;
   an extremum seeking controller to determine the gain, wherein the extremum seeking controller
      determines a gain function based on an error between the voltage at the PCC and the reference voltage, wherein the gain function is a function of time; and
      updates a gain of the controller according to the gain function and a current instance of time; and
   an inverter to regulate the voltage at the PCC according to the modulating signal.

2. The VSC of claim 1, wherein the extremum seeking controller determines the gain function using a time-varying extremum seeking performing a time-varying perturbation of the gain function.

3. The VSC of claim 1, wherein the extremum seeking controller
   determines a cost function relating the gain function to a difference between the voltage at the PCC and the reference voltage integrated over time, such that the gain function is the function of time;
   multiplies the cost function with a first periodic signal of time to produce a perturbed cost function;
   subtracts from the perturbed cost function a second periodic signal having a ninety degrees' quadrature phase shift with respect to a phase of the first periodic signal to produce a derivative of the gain function; and
   integrates the derivative of the gain function over time to produce the gain function as the function of time.

4. The VSC of claim 3, wherein the inverter adjusts a magnitude of a reactive current reference $i_q^*$, wherein the controller is a proportional-integral (PI) controller with varying gains to produce the reactive current reference $i_q^*$ according to $$i_q^*=K_P[v_{tref}(t)-v_t(t)]+K_I\int_0^t[v_{tref}(t)-v_t(t)]dt,$$

wherein $V_{tref}$ is the reference voltage, Vt is the measured voltage, $K_P$ and $K_I$ are the proportional and the integral gains of the PI controller.

5. The VSC of claim 4, wherein the extremum seeking controller determines the gains according to $$\dot{\hat{K}}_P(t)=a_1\sqrt{\omega_1}\cos(\omega_1 t)-k_1\sqrt{\omega_1}\sin(\omega_1 t)Q(\hat{\theta}_{K_P},\Delta t),$$

$$\dot{\hat{K}}_I(t)=a_2\sqrt{\omega_2}\cos(\omega_2 t)-k_2\sqrt{\omega_2}\sin(\omega_2 t)Q(\hat{\theta}_{K_I},\Delta t),$$

$$Q(\theta,\Delta t)=[v_{tref}(t)-v_t(t)]^2,$$

wherein $\hat{K}_p$ is an estimate of the gain $K_p$, $\hat{K}_I$ is an estimate of the gain $K_I$, $k_1$, $k_2$, $a_1$, and $a_2$ are positive gains, $\sin(\omega_1 t)$ is the first periodic signal and $\cos(\omega_1 t)$ is the second periodic signal of frequency $\omega_1$ for estimating the gain $\hat{K}_p$, $\sin(\omega_2 t)$ is the first periodic signal and $\cos(\omega_2 t)$ is the second periodic signal of frequency $\omega_2$ for estimating the gain $\hat{K}_I$, Q is a cost function used by the extremum seeking controller to update the gain at each instance of time $\Delta t$, θ is a vector of gains $[K_p, K_I]$.

6. The VSC of claim 1, wherein the circuitry comprises:
at least one sensor for measuring the voltage at the PCC;
a memory to store the reference voltage for the PCC; and
a clock to produce the current instance of time.

7. The VSC of claim 1, wherein the inverter adjusts a magnitude of a reactive current reference according to the modulating signal to regulate the voltage at the PCC.

8. The VSC of claim 1, wherein the controller comprises:
a maximum power point tracking (MPPT) controller to estimate a voltage corresponding to a global maximum power point (MPP) of power generated by the PV system;
a voltage regulator to produce an active current reference in accordance with voltage corresponding to the global MPP voltage;
a PCC voltage controller to produce a reactive current reference based on the gain of the controller and the error between the voltage at the PCC and the reference voltage;
a current regulator to determine reference voltages for the inverter based on the active current reference and the reactive current reference; and
a pulse-width modulation (PWM) generator for generating the modulating signal as a PWM signal to control the inverter.

9. The VSC of claim 1, wherein the controller includes a proportional-integral (PI) controller with varying gains.

10. A method for regulating a voltage at a point of common coupling (PCC) between a photovoltaic (PV) system and a power grid, comprising:
receiving a reference voltage for the PCC and measurements of a voltage at the PCC;
determining a gain function based on an error between the voltage measured at the PCC and the reference voltage, wherein the gain function is a function of a time;
updating a gain according to the updated gain function and a current instance of time;
generating a modulating signal using the updated gain; and
regulating the voltage at the PCC according to the modulating signal, wherein at least some steps of the method are performed using a processor.

11. The method of claim 10, further comprising:
updating the gain function using a time-varying extremum seeking performing a time-varying perturbation of the gain function.

12. The method of claim 10, further comprising:
determining the current instance of time using a clock operatively connected to the processor.

13. The method of claim 10, further comprising:
adjusting a magnitude of a reactive current reference according to the modulating signal to regulate the voltage at the PCC.

14. The method of claim 10, further comprising:
determining a cost function relating the gain function to a difference between the voltage at the PCC and the reference voltage integrated over time, such that the gain function is the function of time;
multiplying the cost function with a first periodic signal of time to produce a perturbed cost function;
subtracting from the perturbed cost function a second periodic signal having a ninety degrees' quadrature phase shift with respect to a phase of the first periodic signal to produce a derivative of the gain function; and
integrating the derivative of the gain function over time to produce the gain function as the function of time.

15. The method of claim 10, further comprising:
estimating a voltage corresponding to a global maximum power point (MPP) of power generated by the PV system;
producing an active current reference in accordance with voltage corresponding to the global MPP voltage;
producing a reactive current reference based on the gain of the controller and the error between the voltage at the PCC and the reference voltage;
determining reference voltages for the inverter based on the active current reference and the reactive current reference; and
generating the modulating signal as a pulse-width modulation (PWM) signal.

16. A non-transitory computer readable storage medium embodied thereon a program executable by a processor for performing a method for regulating a voltage at a point of common coupling (PCC) between a photovoltaic (PV) system and a power grid, the method comprising:
determining a gain function based on an error between a voltage measured at the PCC and a reference voltage for the PCC, wherein the gain function is a function of a time;
updating a gain according to the updated gain function and a current instance of time;
generating a modulating signal using the updated gain; and
regulating the voltage at the PCC according to the modulating signal.

17. The medium of claim 16, wherein the method further comprises:
updating the gain function using a time-varying extremum seeking performing a time-varying perturbation of the gain function.

18. The medium of claim 16, wherein the method further comprises:
determining the current instance of time using a clock operatively connected to the processor.

19. The medium of claim 16, wherein the method further comprises:
adjusting a magnitude of a reactive current reference according to the modulating signal to regulate the voltage at the PCC.

20. The medium of claim 16, wherein the method further comprises:
determining a cost function relating the gain function to a difference between the voltage at the PCC and the reference voltage integrated over time, such that the gain function is the function of time;
multiplying the cost function with a first periodic signal of time to produce a perturbed cost function;
subtracting from the perturbed cost function a second periodic signal having a ninety degrees' quadrature phase shift with respect to a phase of the first periodic signal to produce a derivative of the gain function; and
integrating the derivative of the gain function over time to produce the gain function as the function of time.

* * * * *